United States Patent
Walker et al.

[11] Patent Number: 5,090,114
[45] Date of Patent: Feb. 25, 1992

[54] TOOL FOR APPLYING SLOT WEDGES

[75] Inventors: Duncan N. Walker, Bauston Lake, N.Y.; Vincent G. Terry, Ft. Lauderdale, Fla.; Dennis R. Ulery, Saratoga, N.Y.; Edmund E. Kazmierczak, Schenectady, N.Y.; Richard J. Keck, Clifton Park, N.Y.; James R. Pedersen; Brian E. Gott, both of Schenectady, N.Y.

[73] Assignee: General Electric Company, Schenectady, N.Y.

[21] Appl. No.: 735,810

[22] Filed: Jul. 25, 1991

Related U.S. Application Data

[62] Division of Ser. No. 557,863, Feb. 26, 1990.

[51] Int. Cl.⁵ .......................................... H02K 15/10
[52] U.S. Cl. ........................................ 29/734; 29/268; 29/598
[58] Field of Search ................. 29/596, 598, 734, 732, 29/268; 310/42, 214, 215

[56] References Cited

U.S. PATENT DOCUMENTS 1,557,259  10/1925  Leland et al. ........................ 29/734 X

*Primary Examiner*—Carl E. Hall
*Attorney, Agent, or Firm*—Nixon & Vanderhye

[57] ABSTRACT

A tool for applying slot wedges having a main arm, a pair of pivotally mounted dogs for engagement in the slot key and straddling the external surface of the slot key, respectively, whereby the tool may be fixed in axial position along the slot key by pressure on the main arm. A second pivotal arm carries a wedge-engaging head whereby the lever is fixed in the slot and the second arm drives the wedge longitudinally into axial position in the slot key.

4 Claims, 3 Drawing Sheets

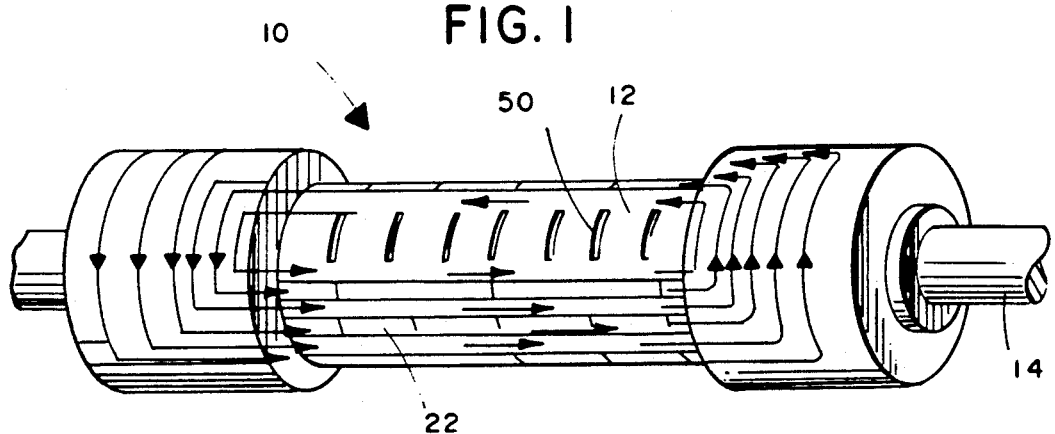
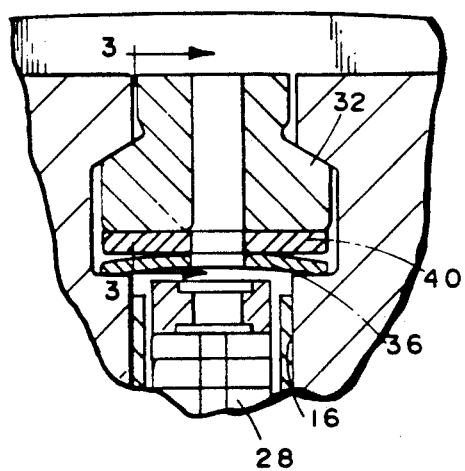 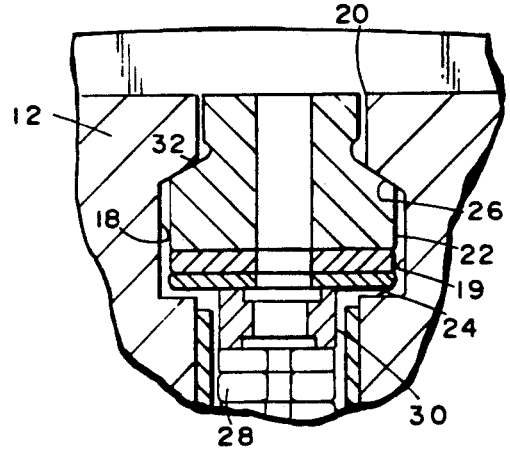
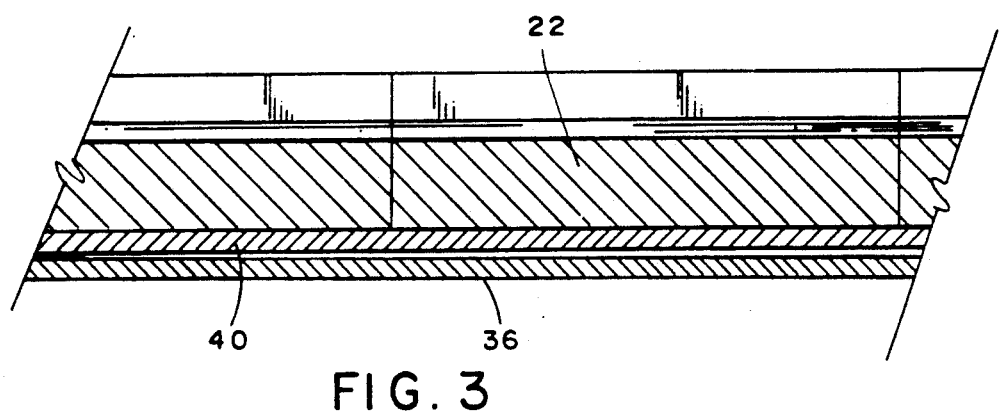

TOOL FOR APPLYING SLOT WEDGES

This is a division of application Ser. No. 07/557,863, filed July 26, 1990.

BACKGROUND AND SUMMARY OF THE INVENTION

The present invention relates generally to a turbo-electric machine for power generation, having rotor and stator windings, and particularly relates to apparatus for maintaining wedges and amortisseurs in slot keys overlying the windings slots and other parts in efficient, sufficient, low-resistance, electrical contact with one another and the rotor body during static start or very low rotor speeds. The present invention also relates to a tool for and method of inserting the wedges in the slot keys, and a method of operating the machine at start-up and low rotor speeds.

In conventional power generators, the rotor is provided with circumferentially spaced, axially extending slots which receive the rotor windings. The windings are retained in the rotor slots by wedges disposed in slot keys radially outwardly of the windings. In conventional turbo-electric machines, a starter motor drives a turbine, typically a gas turbine, up to 65-70% of its operating speed, at which time the turbine becomes operational to drive the generator. When the generator supplies power to the power system, the current which flows through the stator windings sets up rotating magnetic fields which induce a substantial amount of current on the surface of the rotor. These surface currents will flow along various paths, including the rotor wedges, rotor body, amortisseur, and end retaining rings. The centrifugal forces generated at normal operating speeds maintain efficient, low-resistance electrical contact between the various rotor surface current carrying parts, whereby arcing between these parts and localized heating due to the induced currents are avoided.

However, in a static start of the generator where it is employed as the starter motor for the turbo-electric machine, typically to bring the gas turbine up to speed, current is supplied to the motor (generator) windings at a time when the rotor is stationary or rotating at a very low speed, for example, on the order of 3 or 4 r.p.m. This similarly induces substantial surface current in the rotor and associated parts. Under these conditions, the centrifugal forces are virtually non existent or, at least, ineffective to force sufficient electrical contact between rotor parts, for example, between the wedges and the rotor slot surfaces, the amortisseur and the wedges and the amortisseur and the end retaining rings. When substantial induced currents at low r.p.m. flow between rotor parts having gaps or poor contact at their interfaces and hence areas of high resistance, arcing and/or localized heating may occur, causing severe damage to the rotor parts.

To prevent such damage at low r.p.m., insulation may be provided to preclude the induced current flow in discrete zones of interfacing rotor parts. However, this is very difficult to accomplish and is mostly impractical. However, it has been found that radial outward biasing forces, similar to those obtained by centrifugal action when operating at normal speeds, may be provided on the various overlapping faces between the amortisseur, wedges, rotor body, and retaining rings to afford sufficient induced electric current carrying capability at the interfaces of these parts at generator start-up and low rotor speeds. The present invention is directed to apparatus and methods for accomplishing this, apparatus for effectively inserting the wedges in the slot keys taking into account the apparatus providing the biasing forces at start-up and low rotor speeds, and methods of assembly.

According to the present invention, there is provided a generator rotor construction in which the rotor parts in the slot keys over the rotor slots above the rotor windings are maintained under radial outward pressure against themselves, the rotor body, and the retaining rings, and, hence, lie in efficient electrical contact at static start or very low rotor speeds. This construction also enables the centrifugal forces at normal operational speeds to provide efficient, low-resistance, electrical contact between such parts and the rotor body and retaining rings. To accomplish this, and in accordance with the present invention, elongated strip-type springs are disposed in the slot keys underlying the amortisseur and the wedges. The spring strips maintain sufficient radial outward pressure on the amortisseur and wedges to allow the induced surface current during start-up and low rotor speed to flow across the resultant low-resistance interfaces of such parts thereby preventing arcing, localized overheating and damage to the rotor parts.

Each spring strip comprises an elongated piece of conductive or non-conductive material which is arcuate in transverse cross-section. In the slot keys, the spring strips have elongated edges which bear on shoulders at the base of the slot keys. Because of the curvature of the spring strips, they bear upwardly against the underside of an elongated amortisseur which, in turn, underlies the wedges and the retaining rings. The slot amortisseur is an integral one-piece construction and extends the entire length of the windings slots. Additional amortisseur pieces are used at the ends of the rotor body underneath the retaining rings and comprise short fingers which overlap the integral slot amortisseur that runs the entire length of the rotor. The wedges and springs are provided in discrete lengths in the slot keys. The spring strips also have one or more apertures therethrough for conducting rotor cooling gas, the apertures lying in registry with corresponding apertures through the amortisseur and wedges. Thus, the spring strips bias the rotor parts in the slot keys radially outwardly and, hence, into low-resistance contact, at the interfaces between these rotor parts, along the length of the slot keys, particularly at generator (motor) start-up and low speeds. These interfaces lie between the rotor body and wedges, the amortisseur and wedges, the spring strips and the amortisseur, the rotor body and the spring strips, and, at the rotor ends, between the amortisseur and amortisseur finger and the end retaining rings. It will be appreciated, however, that the centrifugal forces extant at operational speeds will force the rotor parts in the slot keys into contact with one another and the rotor body, and, at the rotor ends, into contact with the retaining rings, thereby affording efficient low-resistance induced surface current flow paths between rotor parts.

Surface currents during start-up and low rotor speeds will also flow through throttled areas between the ends of cross-slots in the rotor and the windings slots. With such high currents, these confined areas may become overheated with ensuing damage. In order to accommodate these high induced currents at start-up and low rotor speeds, the present invention provides cross-slots which are reduced in depth and are axially spaced closer to one another than in a conventional rotor construction to provide the required flexibility needed for rotor body bending symmetry as the rotor rotates. Thus, for example, axial spacing between the cross-slots of 12 inches in prior rotors has been reduced to approximately 8 inches. The more shallow depth of the cross-slots enables the distance between the ends of the cross-slots and the winding slots to increase, for example, on the order of about 2 to 3 inches.

There is also provided in accordance with the present invention a tool for assembling the wedges in the slot keys. It will be appreciated that the spring strips and amortisseur are necessarily disposed in the slot keys before the wedges are inserted into the slot keys. This requires the wedges to be inserted in the confined space between the wedge-retaining surfaces of the slot key of the rotor body and the amortisseur and against the bias of the spring strips. The tool comprises a pair of tool dogs, one of which is pivotally carried on a main arm. One dog is designed to have a cross-section at its distal end corresponding to the upper portion of the slot key and is rotatable for insertion into the slot key. The second dog has a generally T-shaped cross-section for abutment against the outer margins of the rotor body which straddle the slot key. Thus, by forcing the main arm downwardly, the dogs fix the tool in a predetermined axial position along the rotor. A second arm is pivotally attached to the main arm and includes a driving head for engaging an end of a wedge. The underside of the wedge adjacent one end is provided with a shallow, tapered surface to facilitate initial insertion of the wedge into the slot key. Thus, when the wedge has been started in the slot and the tool dogs fix the tool to the rotor body at a selected axial position along the slot key, the second arm is rotated to engage the head against the wedge and, upon further rotation, advances the wedge along the slot key. This operation is repeated until the wedge is disposed in its predetermined axial position.

In a preferred embodiment according to the present invention, there is provided an electric machine having a rotor body, elongated axially extending slots in the rotor body for containing rotor windings and elongated axially extending slot keys overlying the windings slots. A rotor parts assembly is provided comprising at least one wedge disposed in each slot key overlying the windings slot, and an elongated spring strip having a length greater than its width is disposed between the wedge and the body in each slot key and extends generally in the axial direction for biasing the wedge in a radial outward direction.

In a further preferred embodiment according to the present invention, there is provided a rotor for an electric machine, comprising a rotor body having elongated axially extending slots for containing rotor windings and elongated axially extending slot keys overlying the windings slots, each slot key having a pair of contact surfaces facing generally inwardly of the rotor, a plurality of wedges disposed in each slot key overlying the windings slot with each wedge having a pair of surfaces in opposition to the pair of surfaces of the slot key, and a plurality of elongated spring strips, each having a length greater than its width, disposed in each slot key and extending generally in the axial direction for biasing the wedge in a radial outward direction to engage the pairs of surfaces and provide low electrical resistance contact paths between the engaged pairs of surfaces.

In a still further preferred embodiment according to the present invention, there is provided a tool for applying wedges in slot keys overlying windings retaining slots in a rotor body of an electric machine wherein the slot keys have at least one spring element for biasing the wedge in the slot key into high-pressure, efficient electrical contact with the rotor body, comprising a lever having a main arm and a pair of dogs carried by the lever adjacent an end of the main arm, one of the dogs shaped for disposition in the slot keys and the other dog shaped to overlie the slot keys whereby pressure applied to the main arm, with the one dog in a slot key and the other dog overlying the slot key, applies pressure to the dogs in opposite directions, thereby fixing the lever at a predetermined axial position along the slot key, and a second arm pivotally carried by the lever and carrying a head for engaging the wedge whereby, upon fixing the lever at a predetermined axial position along the slot key, the second arm may be pivoted to advance a wedge along the slot key.

In a still further preferred embodiment according to the present invention, there is provided a method of assembling rotor parts in the rotor body of a turbo-electric machine for affording efficient electrical contact between the rotor surface current carrying parts at machine start-up or low rotor speeds wherein the rotor body has slot keys for receiving spring strips, an amortisseur and wedges for retaining rotor windings in underlying windings slots, comprising the steps of (a) inserting an amortisseur into a slot key, (b) inserting a plurality of spring strips between the amortisseur and the base of the slot key, (c) inserting a wedge into the slot key to overlie the amortisseur, (d) advancing the wedge longitudinally along the slot key until the wedge reaches a location therealong adjacent an underlying spring strip, (e) incrementally advancing the wedge along the slot key to overlie the spring strips and (f) repeating steps (b)-(e) until the wedges, amortisseur and spring strips each extend the full longitudinal length of the slot key.

In a still further preferred embodiment according to the present invention, there is provided a method of starting a generator or operating the generator at low rotor speeds wherein efficient electrical contact is afforded between rotor surface current carrying parts at start-up and low rotor speed, the generator having a rotor body, elongated axially extending slots in the rotor body for containing rotor windings and elongated axially extending slot keys overlying the windings slots, comprising the step of biasing (1) an elongated amortisseur disposed in each slot key and having a length coextensive therewith in a radial outward direction against the underside of a plurality of wedges in each slot key overlying the corresponding amortisseur and (2) the plurality of wedges radially outwardly against the rotor body, into continuous electrical contact along the amortisseur, wedges and rotor body at their respective interfaces wherein arcing and localized heating is substantially precluded at the respective interfaces during generator start-up and low rotor speeds due to induced surface current flow across the interfaces.

Accordingly, it is a primary object of the present invention to provide novel and improved apparatus and methods for maintaining high pressure, low resistance and hence, efficient electrical contact, between rotor parts during static start or low rotor speeds in a turbo-electric machine. It is also an object of the present invention to provide a novel and improved tool for assembling the wedges in the slot keys of the windings slots overlying the windings and a method of assembly.

These and further objects and advantages of the present invention will become more apparent upon reference to the following specification, appended claims and drawings.

BRIEF DESCRIPTION OF THE DRAWING FIGURES

FIG. 1 is a perspective view of an electric machine constructed in accordance with the present invention;

FIGS. 2A and 2B are enlarged cross-sectional views of a wedge, a key slot and a portion of a winding slot during static start or at low rotor speeds and high-speed operations, respectively;

FIG. 3 is a cross-sectional view thereof taken generally about on lines 3—3 in FIG. 2A;

Figure 6:
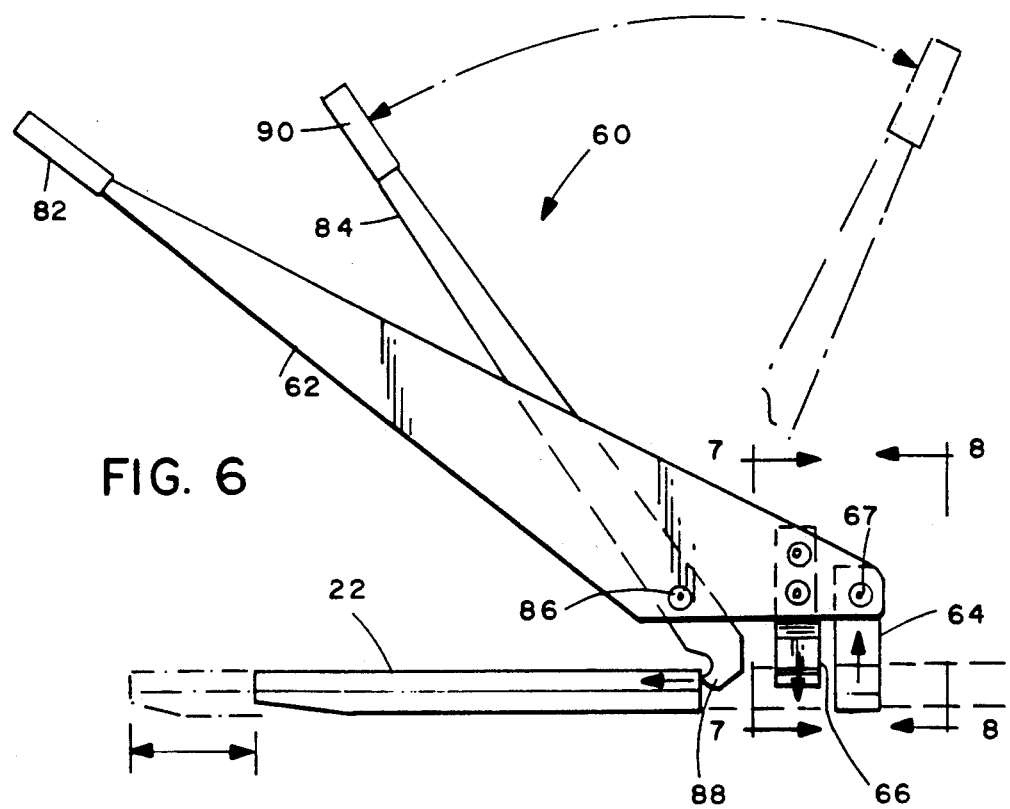
Figure 7:
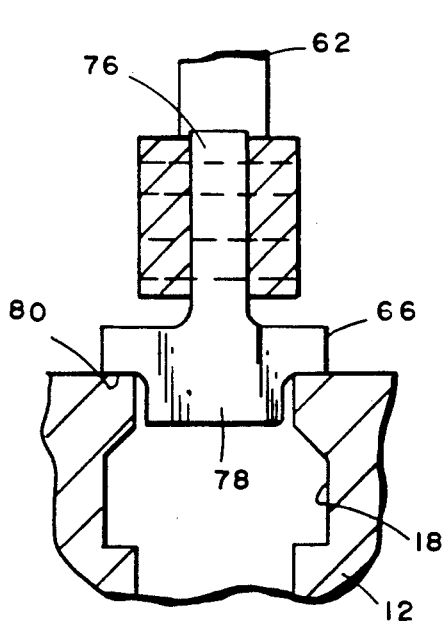
Figure 8:
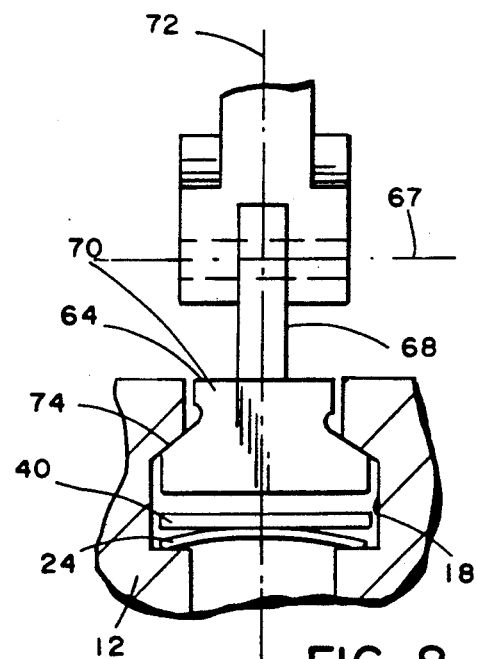

FIG. 6 is an enlarged side elevational view illustrating a tool constructed in accordance with the present invention for inserting the wedges in the slot keys of the rotor and schematically illustrating the operation of the tool; and FIGS. 7 and 8 are enlarged cross-sectional views illustrating the respective dogs of the tool and taken generally about on lines 7—7 and 8—8, respectively, in FIG. 6.

DETAILED DESCRIPTION OF THE DRAWING FIGURES

Reference will now be made in detail to a present preferred embodiment of the invention, an example of which is illustrated in the accompanying drawings.

Referring now to FIG. 1, there is illustrated a power generator, generally designated 10, constructed in accordance with the present invention, including a rotor 12 carried on a shaft 14 and having a plurality of circumferentially spaced, axially extending slots 16 (FIG. 2A) for receiving the rotor windings. Radially outwardly of the windings slots 16 and substantially axially coextensive therewith are slot keys 18, which open at 20 through the outer peripheral surface of rotor body 12. The key slots 18 have a cross-sectional configuration to house and retain wedges 22, an amortisseur 40, and a spring 36, for purposes which will become clear from the ensuing description. Each key slot in the illustrated preferred embodiment has an enlarged base portion 19 defining base flanges 24 adjacent the opening to windings slot 16 and inclined wall surfaces 26 spaced opposite flanges 24. The windings and a creepage block 28 and 30, respectively, are illustrated in windings slot 16 in FIGS. 2A and 2B. Each wedge 22 has a cross-sectional shape for reception in and which is substantially complementary to a slot key 18. Thus, wedges 22 have bearing surfaces 32 for engaging and forming low-resistance, electrical contact paths with surfaces 26 of the slot keys 18. While a substantial dovetail shape is described and illustrated as the substantial complementary cross-sectional shapes of the wedges and slot keys, it will be appreciated that other shapes of the slot keys and wedges may be used to retain the windings and ancillary parts in the windings slots 16 during operation.

Figure 4:
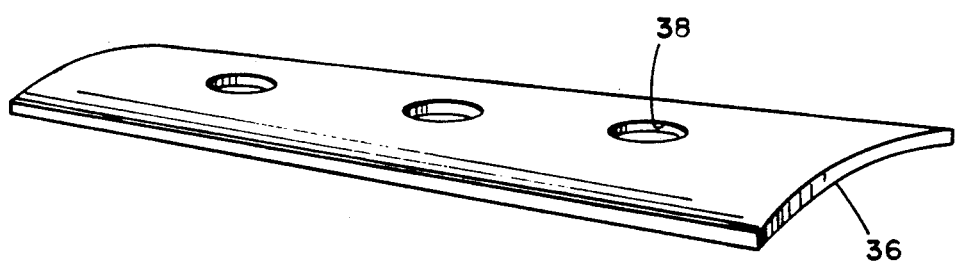
FIG. 4 is an enlarged perspective view of a spring strip according to the present invention.

Referring now to FIGS. 2, 3 and 4, and in accordance with the present invention, there is provided a plurality of elongated spring strips 36 for disposition in each slot key. Each spring strip 36 has a length greater than its width and is dimensioned for disposition between opposite side walls of slot keys 18 with its marginal edges on flanges 24. As illustrated in FIG. 4, the spring strip 36 has an upward curve or bow about an axis parallel to its long dimension and, hence, parallel to the axis of the rotor when placed in the slot keys. The spring strip axis lies between the rotor axis and the strip 36. A plurality of apertures 38 are provided through spring strips 36 to provide cooling passages, as described hereafter. The spring strips 36 are provided in discrete lengths, for example, equal to the length of the discrete wedges 22. Also, disposed between the underside of the wedges 22 and the upper bowed surface of spring strips 36 is an elongated amortisseur 40. The amortisseur comprises a single integral strip of material with ends which extend beyond the slot keys 18 to the ends of shrink-fit regions. It will be appreciated that the wedges and amortisseur are formed of electrically-conductive materials. The spring strips may be formed of electrically conductive or non-conductive material. For example, wedges 22 may be formed of stainless steel, the amortisseur 40 may be formed of aluminum and the strip spring 36 may be formed of a nickel-base alloy or a non-metallic.

Referring to FIG. 3, spring strips 36 have their long marginal edges engaging, prior to start of the generator or at low rotor speeds, along flanges 24 at the base of slot keys 18. The spring strips 36 and wedges 22 are preferably staggered in the longitudinal direction relative to one another, such that abutting ends of spring strips 36 lie substantially medially of the overlying wedges 22. Of course, amortisseur 40 underlies the discrete wedges 22 and overlies the discrete spring strips 36.

Figure 5:
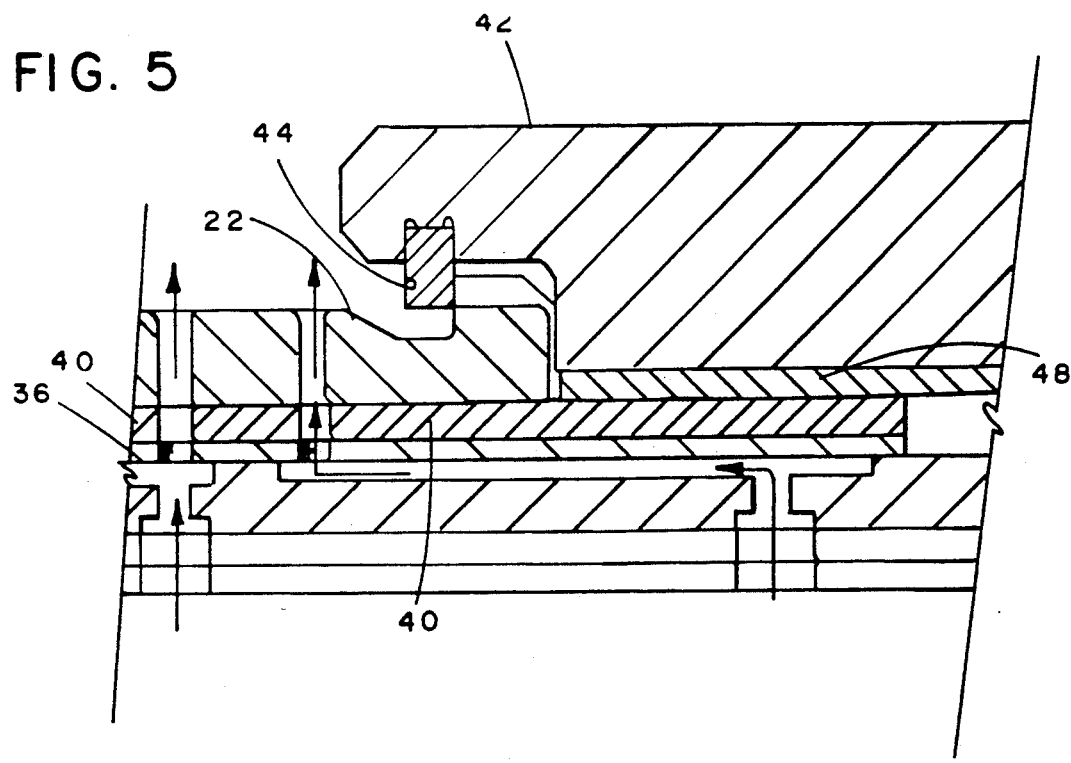
FIG. 5 is a longitudinal cross-sectional view similar to FIG. 3 taken along a radial plane of the rotor and illustrating an end of the rotor with a retainer ring.

Referring to FIG. 5, each end of rotor 12 includes a retaining ring 42. A locking ring 44 engages in locking teeth in the rotor body and engages a groove along the inside surface of ring 42 to retain ring 42 on the rotor. Underlying end wedge 22 is the end of amortisseur 40 and a spring strip 36. An amortisseur end finger 48 is disposed between the inner surface of retainer ring 42 and the outer surface of amortisseur 40. A spring strip 36 is disposed between the amortisseur end and the key slot whereby electrical contact is made between the amortisseur and amortisseur finger as well as between the amortisseur finger and the retainer ring 42. Also illustrated in FIGS. 2 and 5 are cooling openings passing through the windings slots and into the slot keys by way of the registering apertures formed in the spring strips, amortisseur and wedges. These registering openings are provided with cooling gas in a manner well known in this art.

Referring back to FIG. 1, there is illustrated a plurality of axially-spaced, circumferentially-extending cross-slots 50 in the pole faces of the rotor. Because of the necessity to carry the induced surface currents between the ends of the coil slots and the cross-slots, the slots are cut less deeply than conventional such that the ends of the cross-slots are also spaced further from the coil slots in the circumferential direction. This provides sufficient conducting material between the ends of the cross-slots and the coil slots to conduct the induced electrical current.

It will be appreciated that the wedge, amortisseur and spring strip lie in the configuration illustrated in FIG. 2A prior to start-up and during low rotor speeds. Consequently, spring strips 36 bias amortisseur 40 and wedges 22 radially outwardly for sufficient contact therebetween and between wedge surfaces 32 and the slot key surfaces 26 forming part of the rotor body to afford good mechanical and electrical contact. Thus, electrical arcing and localized heating between these parts from induced current flow is avoided by the mechanically tight contact and low-resistance electrical path between these parts at static start and low rotor r.p.m. Note particularly that the (a) rotor body and the margins of the spring strips, (b) spring strips and amortisseur, (c) amortisseur and wedges, and (d) wedges and rotor body lie in tight mechanical abutting relation to one another respectively and, hence, arcing and/or localized heating across those interfacing areas are prevented. Thus, during start-up and low rotor speeds the induced surface current is afforded low-resistance, non-arcing current paths across the interfaces of the rotor parts. Low rotor speed may be defined as speeds up to about 360–400 r.p.m. or less. In that range, the strip springs are effective to avoid arcing and localized heating. Beyond those speeds, centrifugal forces are the major factors maintaining electrical contact.

Additionally, the spring strips underlying the ends of the amortisseurs, in turn, underlying the amortisseur fingers, bias these parts outwardly at start-up and low rotor speeds. Thus, sufficient mechanical and electrical contact is maintained between these parts and the retainer rings to afford efficient electrical contact therebetween.

Referring to FIG. 2B, at operational speeds with the turbine driving the generator, the centrifugal force acting on the windings, strip springs, amortisseur and wedges cause these rotor parts to maintain these low-resistance, conductive current paths.

Referring to FIGS. 6–8, there is provided a tool for inserting wedges 22 into slot keys 18. The tool, generally indicated 60 in FIG. 6, includes a main arm 62 carrying a pair of dogs 64 and 66. Dog 64 is mounted for pivotal movement on an end of arm 62 about a transverse axis 67. Dog 64 includes a pin 68 which, at its lower end, rotatably receives a shaped lug 70. Lug 70 is shaped for disposition in the slot keys but has a lesser depth than the depth of the wedges 22 whereby, when disposed in the slot key, the underside of lug 70 is spaced from the amortisseur 40. The connection between lug 70 and pin 68 is a pivotal connection such that the lug 70 may be rotated about axis 72 for disposition of lug 70 within the slot key and engagement of its inclined surfaces 74 with the registering inclined surfaces 26 of the slot key.

Dog 66 is illustrated in FIG. 7 and comprises a stem 76 suitably secured to the main arm 62, for example, by a pair of pins. The lower end of stem 76 carries a generally T-shaped lug 78 having a bottom portion for engaging through the opening of the slot key and a pair of outwardly directed flanges 80 for overlying the margins of the opening of the slot key through the rotor surface such that lug 78 straddles the opening.

With this arrangement, the dog 64 may be inserted into the slot key and the dog 66 disposed about the marginal edges of the rotor surface straddling the slot key opening. By applying a pressure, for example, a counterclockwise pressure to handle 82 of main arm 62, it will be appreciated that the dogs 64 and 66 cause the tool 60 to be locked into a selected axial position along the slot key.

Tool 60 also includes a second lever 84 pivoted at 86 adjacent its lower end to the main arm 62. Second arm 84 carries a wedge-driving head 88 on the opposite side of pivot 86 from handle 90. Consequently, when tool 60 is fixed in axial position along the rotor body by engagement of the dogs, second arm 84 may be rotated, for example, in a clockwise direction as illustrated in FIG. 6, to engage head 88 against an end of wedge 22 to slide the wedge 22 along the slot key.

To use the tool and insert the wedges, the amortisseur is first placed in the slot along the entire length of the rotor body and the spring strips are then inserted under the amortisseur and pushed to the center of the rotor body with a suitable tool. The ventilation apertures in the spring strips are used to assure proper spring and amortisseur longitudinal alignment along the slot keys. A wedge is then inserted into the slot at the end of the rotor body and moved freely toward the center area of the rotor body until it reaches a point where the first spring strip causes the slot to be insufficient in depth to accommodate the wedge. Thus, the amortisseur and previously inserted strip springs and wedge reside in the slot key. The resistance to sliding movement of the next wedge inserted into the slot key is provided by the outward bias of spring strips 36 and the elongated amortisseur 40 disposed in the slot key whereby substantial force is required to displace the wedge along the slot key and against the bias of springs 36. Thus, the tool is clamped to the rotor, as previously described. By rotating arm 84, the next wedge is pushed along the slot key a predetermined distance, for example, on the order of 2 inches, by force on the order of 15–30 pounds exerted on the upper handle of the arm. As the wedge is advanced by the head 88 of arm 84, the wedge is pushed up over the top of the amortisseur, thus flattening the underlying strip springs previously inserted under the amortisseur ahead of the wedge. With the new wedge in the slot key above the amortisseur and strip springs, the strip springs are now flattened to a limited extent, although retaining an arcuate shape, as illustrated in FIG. 2A, to bias the amortisseur and wedge outwardly. The tool is then unclamped from the rotor, moved along the slot a predetermined distance and the sequence repeated until the wedge is in its final position. Assembly is continued in this manner until all of the wedges, springs and amortisseur are assembled in each slot key.

At the ends of the rotor, the amortisseur fingers 48 placed in the slots overlying the amortisseur 40. By shrink-fitting the end winding retaining ring 42 on the rotor end, causing the end spring strip to flatten under the amortisseur end, the amortisseur end and amortisseur finger form sufficient mechanical contacts therebetween and with the retaining ring to afford efficient electrical contact.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A tool for applying wedges in slot keys overlying windings retaining slots in a rotor body of an electric machine wherein the slot keys have at least one spring element for biasing the wedge in the slot key into high-pressure, efficient electrical contact with the rotor body, comprising a lever having a main arm and a pair of dogs carried by said lever adjacent an end of said main arm, one of said dogs shaped for disposition in the slot keys and the other dog shaped to overlie the slot keys whereby pressure applied to said main arm, with the one dog in a slot key and the other dog overlying the slot key, applies pressure to said dogs in opposite directions, thereby fixing the lever at a predetermined axial position along the slot key, and a second arm pivotally carried by said lever and carrying a head for engaging the wedge whereby, upon fixing the lever at a predetermined axial position along the slot key, the second arm may be pivoted to advance a wedge along the slot key.

2. Apparatus according to claim 1 wherein one of the dogs is pivotally connected to said main arm.

3. Apparatus according to claim 1 wherein said one dog is pivotally connected to said main arm for rotation about a pair of axes disposed at right angles to one another.

4. Apparatus according to claim 1 wherein the pivot axis of said second arm lies to one side of the dogs.

* * * * *